UNITED STATES PATENT OFFICE.

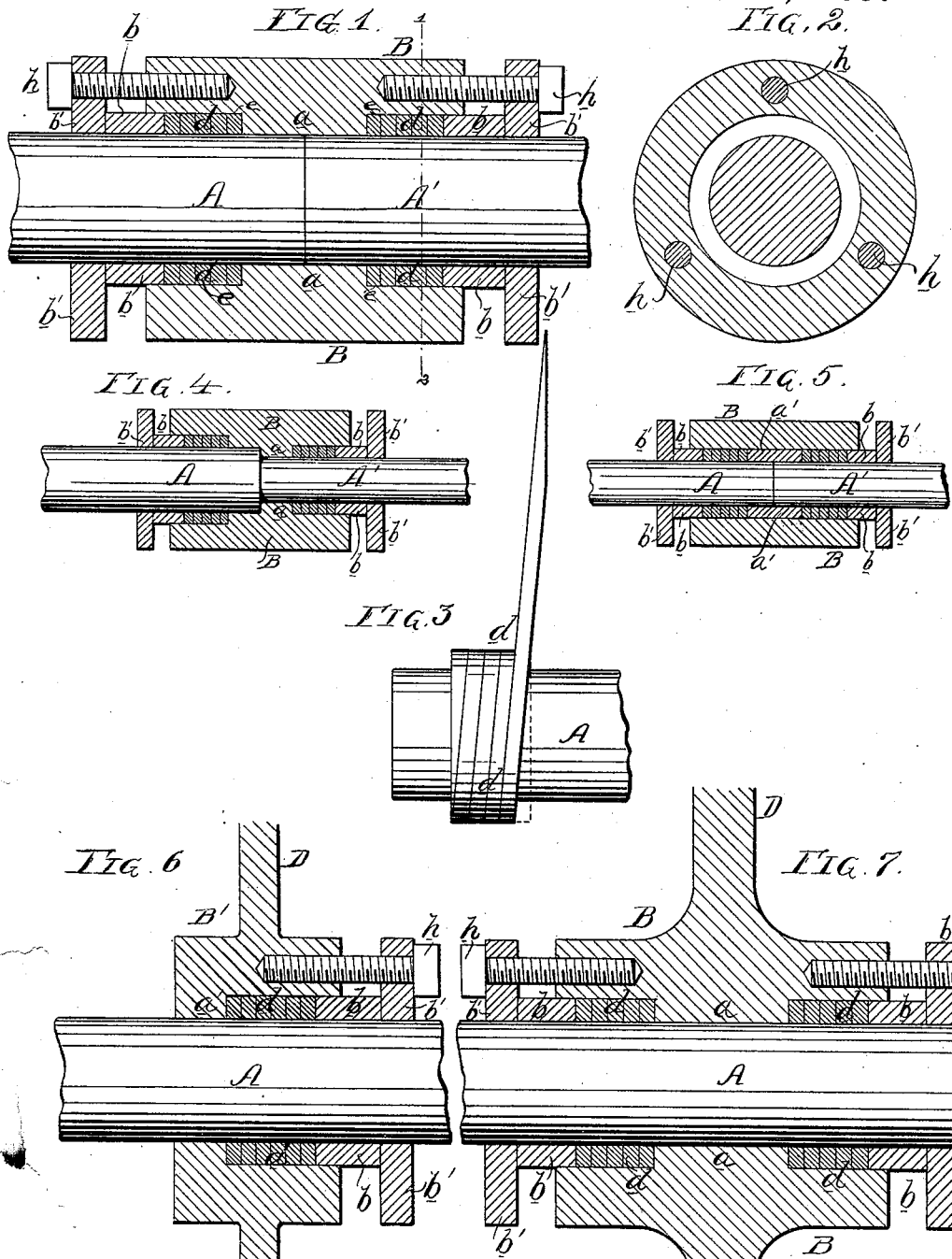

THADDEUS NORRIS, JR., OF PHILADELPHIA, PENNSYLVANIA.

IMPROVEMENT IN DEVICES FOR SECURING COUPLING-BLOCKS, WHEELS, &c., TO SHAFTS.

Specification forming part of Letters Patent No. 212,257, dated February 11, 1879; application filed January 7, 1879.

*To all whom it may concern:*

Be it known that I, THADDEUS NORRIS, Jr., of Philadelphia, Pennsylvania, have invented a new and useful Improvement in Securing Coupling-Blocks, Wheels, and other Objects to Shafts, of which the following is a specification:

The purport of my invention is the economical and effective fastening of coupling-blocks, wheels, pulleys, and other objects to shafts, by interposing and compressing rubber or other equivalent elastic material between the said shafts and the coupling-blocks, or between the hubs of pulleys or wheels and shafts, in the manner substantially as explained hereinafter.

In the accompanying drawings, Figure 1 illustrates my invention as applied to a shaft-coupling, the latter being in section; Fig. 2, a transverse section on the line 1 2, Fig. 1; Fig. 3, part of one of the shafts, showing the coupling medium which I prefer to employ; Figs. 4 and 5, modifications of the coupling; and Figs. 6 and 7 illustrate the application of my invention to the securing of wheels, pulleys, &c., to shafts.

In Figs. 1, 2, and 3, A and A' are the end portions of two adjoining shafts, and B the coupling-block, the central portion, $a$, only of which fits snugly to the two shafts, the bore of the block being enlarged at or near each end, so as to form round each shaft an annular chamber, $e$, for the reception of the medium, by the compression of which the junction of the coupling-block with the shaft is effected, this medium consisting, in the present instance, of a strip, $d$, of rubber, coiled round each shaft, as shown in Fig. 3. A metal ring or follower, $b$, fits snugly, but so as to slide freely, in each annular chamber, and against each ring a plate, $b'$, is caused to bear by set-screws $h$, on tightening which the rubber may be so compressed within the annular chambers as not only to resist all torsion to which the shafts are ordinarily subjected, but also to withstand any end strains tending to move the shafts apart from each other.

A solid ring of rubber or a number of rings of rubber may be introduced into the annular chamber; but I have ascertained by numerous tests that coiled strips of rubber are the most effective, and can be readily removed after the followers have been withdrawn.

Strips or rings composed partly of canvas and partly of rubber may be used—indeed, any yielding material possessing inherent elasticity and an adhesive affinity for metal may be employed—but rubber is believed to afford the best medium for connecting the shafts and coupling-block together.

The ring or follower $b$ and plate $b'$ may be made in one piece, and for the set-screws at each end of the coupling bolts, passing entirely through the coupling-block, may be used, or any other devices may be employed for imparting pressure to the rubber through the medium of a follower.

A prominent advantage of my invention independently of its economy is the facility with which it can be adapted to the connecting of two shafts of unequal diameter together. The view, Fig. 4, will serve as a sufficient explanation of this feature.

The central portion, $a$, of the block may consist of a ring, $a'$, Fig. 5, made separately from the block and fitting snugly in the same and to the shafts.

The mode of applying my invention to the securing of pulleys, wheels, &c., to shafts is illustrated in Fig. 6, in which view B' represents the hub, and D the arms or webs, of a wheel or pulley.

The hub is chambered from one end throughout a portion of its length for the reception of the rubber, the remaining portion $a'$ fitting snugly to the shaft. The rubber is compressed in the annular chamber by bolts or screws through the medium of a ring, $b$, and plate $b'$, as in the case of the coupling.

If the hub of the wheel or pulley or other object be bored truly, its truth on the shaft will be assured by that portion of the hub which fits to the same and by the ring or follower.

The hubs of large wheels or pulleys may be secured to shafts in the same manner as the coupling—that is, by two elastic mediums and two followers—as shown in Fig. 7.

Cranks, eccentrics, collars, chucks, and indeed any objects which have been heretofore secured to shafts may be attached to the same in the manner described; and where flattened, square, or many-sided shafts or spindles are used, the proper longitudinal position of wheels or other objects on them may be assured by the interposition and compression of rubber or other equivalent yielding material, in the manner described.

I claim as my invention—

The mode described of securing coupling-blocks, wheels, pulleys, and other objects to shafts—that is to say, by the interposition and compression of rubber or other equivalent elastic material between the interior of the coupling-block or hub of a wheel or pulley or other analogous object and the shaft or shafts with which the rubber is in direct contact, all substantially as set forth.

In testimony whereof I have signed my name to this specification in the presence of two subscribing witnesses.

THADDEUS NORRIS, JR.

Witnesses:
　WM. J. COOPER,
　HARRY SMITH.